Figure 1:
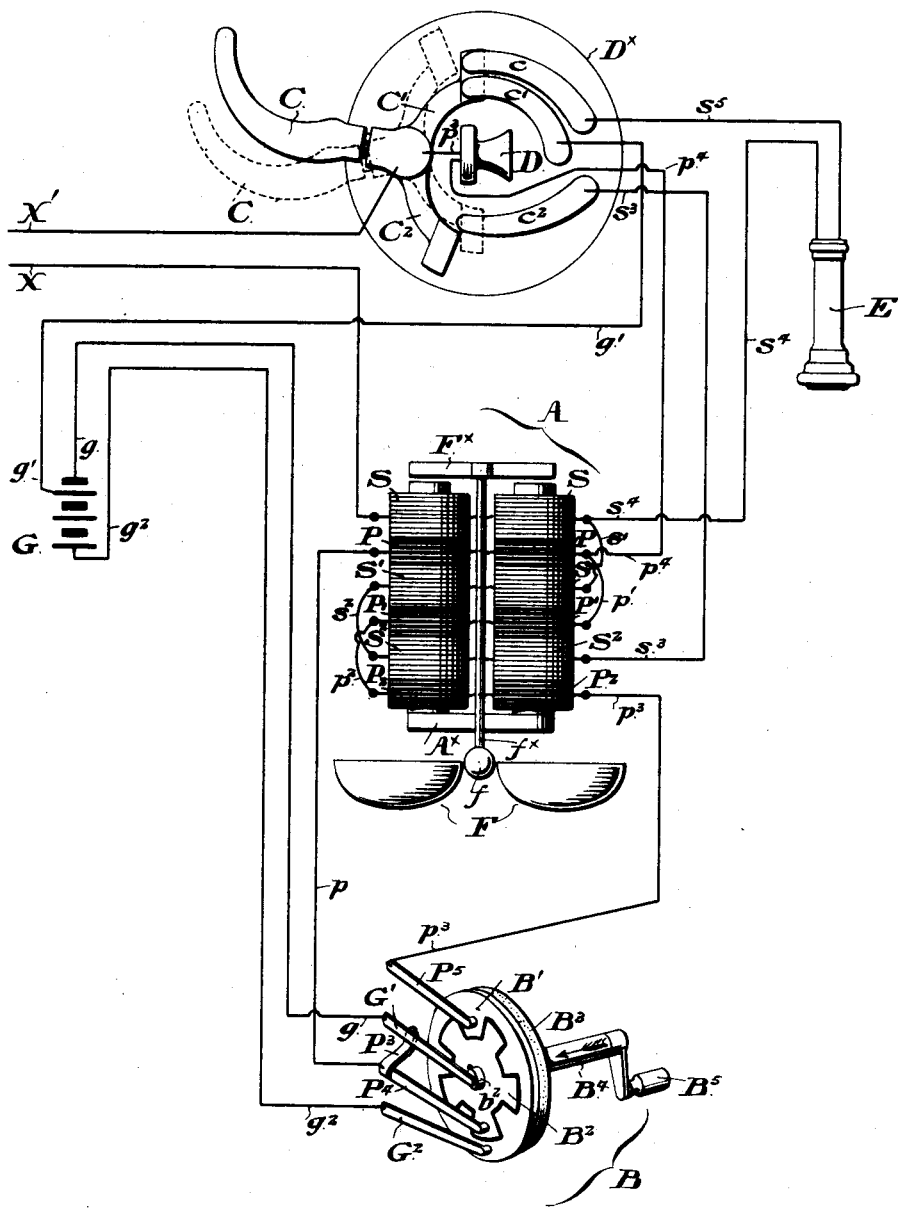

No. 610,347. Patented Sept. 6, 1898.
W. A. DRYSDALE.
TELEPHONE.
(Application filed Sept. 17, 1897.)
(No Model.) 4 Sheets—Sheet 1.

WITNESSES:
A. J. Zahm.
F. C. Morley.

INVENTOR:
WILLIAM A. DRYSDALE,
By A. E. Paige, Atty.

No. 610,347. Patented Sept. 6, 1898.
W. A. DRYSDALE.
TELEPHONE.
(Application filed Sept. 17, 1897.)

(No Model.) 4 Sheets—Sheet 4.

WITNESSES:
A. J. Zahm.
F. C. Morley

INVENTOR:
WILLIAM A. DRYSDALE,
By A. E. Paige, Atty.

THE NORRIS PETERS CO., PHOTO-LITHO., WASHINGTON, D. C.

UNITED STATES PATENT OFFICE.

WILLIAM A. DRYSDALE, OF PHILADELPHIA, PENNSYLVANIA.

TELEPHONE.

SPECIFICATION forming part of Letters Patent No. 610,347, dated September 6, 1898.

Application filed September 17, 1897. Serial No. 651,985. (No model.)

*To all whom it may concern:*

Be it known that I, WILLIAM A. DRYSDALE, of Philadelphia, in the State of Pennsylvania, have invented certain new and useful Improvements in Telephony, of which the following is a specification, reference being had to the accompanying drawings.

My invention relates particularly to the adjunctive apparatus which, in connection with the ordinary receiver and transmitter, comprise a commercial-telephone terminus or station. As is well known, such a station ordinarily comprises a receiver, a transmitter, an induction-coil for the talking-circuit, a battery for the talking-circuit, a signal, such as a bell or buzzer, and a magneto-generator for signaling upon the line, together with switches, wiring connections, &c.

It is the object of my invention to provide a substitute for the ordinary magneto-generator capable of all of the functions of the latter, but of such dimensions as to permit of its inclusion within a casing or stand adapted to hold the other elements of a desk-station or outfit. Moreover, said substitute device may be so arranged as not only to perform the functions of the magneto-generator, but also of the ordinary ringer or station-signal and the induction-coil of the talking-circuit. Such a triple use of my invention permits of its embodiment in apparatus of minimum dimensions, as hereinafter described in detail.

Broadly speaking, my improved signaling device comprises a converter the primary coils of which are connected with the battery of the talking-circuit or other suitable source of electricity and manually-operative means whereby the direction of current through said coils may be rapidly reversed to induce an alternating current in the secondary coils of said converter of such potential as to be equivalent to that produced by the magneto-generator aforesaid. The coils of said converter are preferably arranged to coöperate with a vibratory armature, and thus serve as a ringer or signal for the station. When said converter is also used as a substitute for the ordinary induction-coil of the talking-circuit, the coils of said converter are conveniently subdivided to permit such a variable number of said subdivisions to be used in connection with the talking-circuit as best adapted for the particular length of line with which the outfit is connected.

Furthermore, my invention comprises an automatic switch peculiarly adapted for inclosure within the casing of the transmitter of a desk outfit and various other minor improvements tending to compactness of construction, as hereinafter described.

Figure 2:
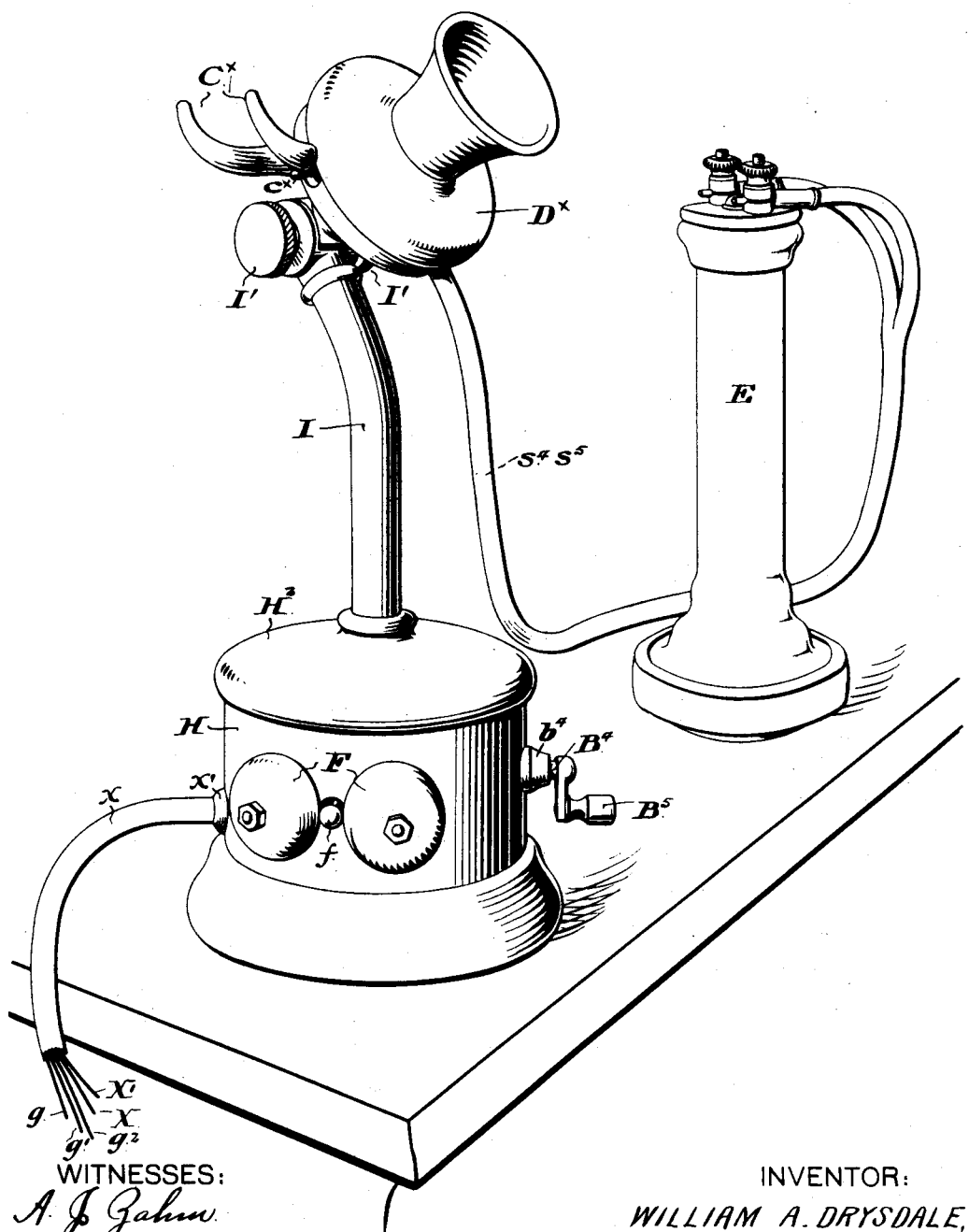
Figure 3:
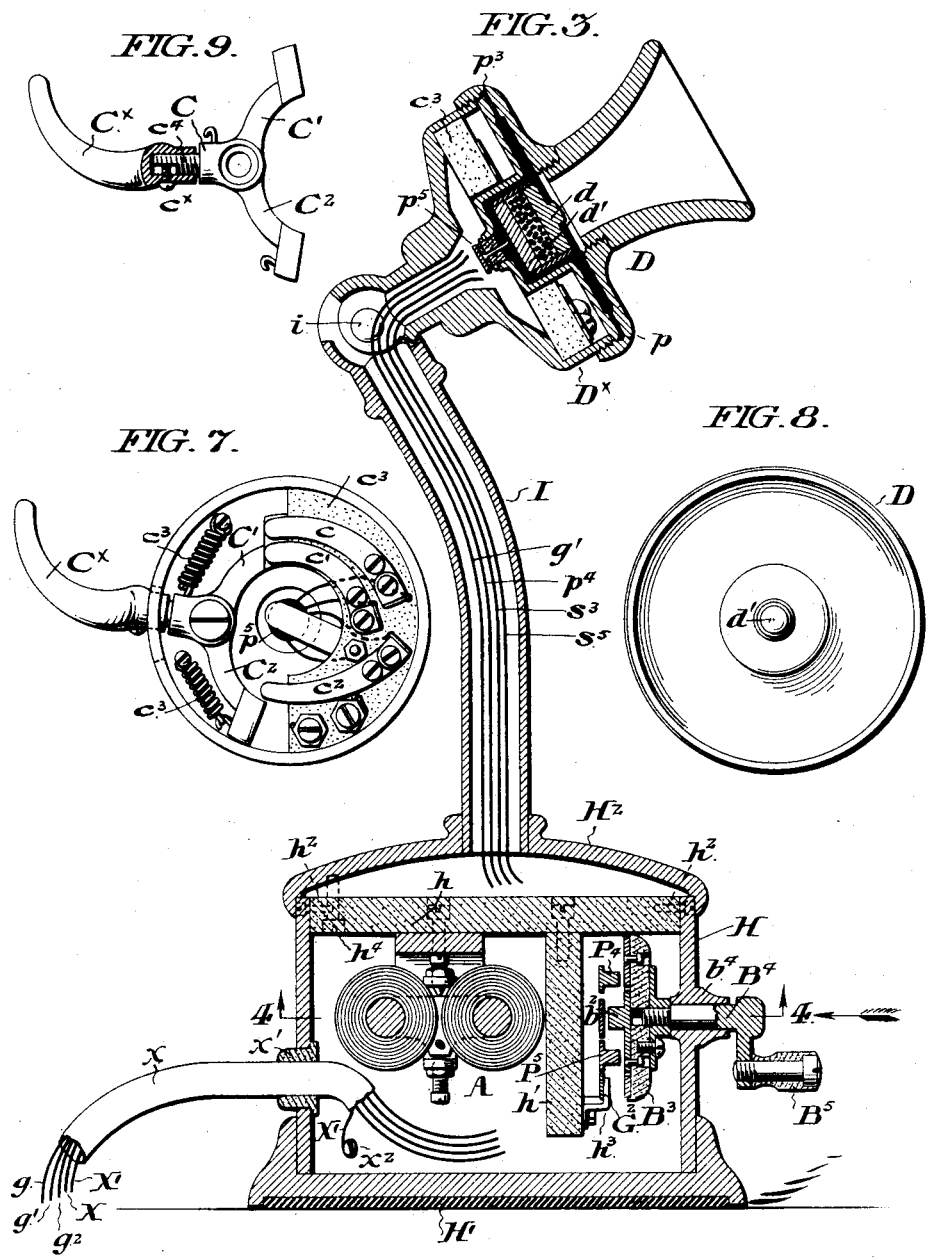
Figure 4:
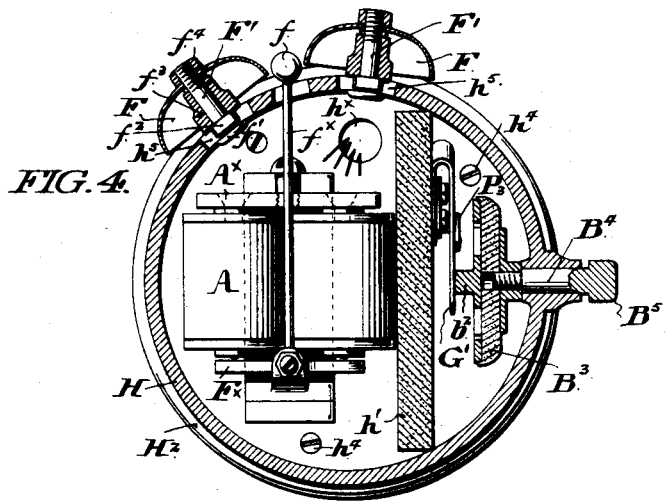
Figure 5:
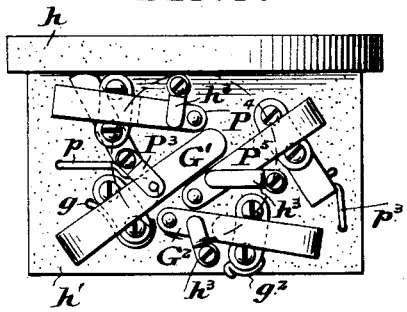
Figure 6:
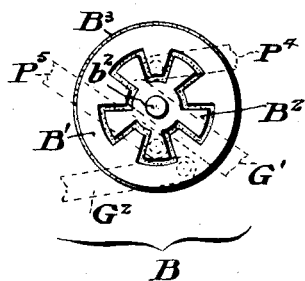

In the accompanying drawings, Figure 1 is a diagrammatic view of my invention, showing the various elements comprising a telephone-station and a convenient manner of wiring the same. Fig. 2 is a perspective view of a complete desk outfit embodying my invention. Fig. 3 is a vertical central section through the inclosing casing of said apparatus. Fig. 4 is an inverted plan view on the line 4 4 in Fig. 3. Figs. 5 and 6 are detail views of the signaling device. Fig. 7 is a front elevation of the transmitter-casing with the transmitter-head removed. Fig. 8 is a rear elevation of the transmitter-head. Fig. 9 is a detail view of the automatic switch-lever removed from the transmitter-casing.

Referring to Fig. 1 of the accompanying drawings, A is the converter, adapted for the triple use aforesaid. B is the reversing-switch, used in conjunction with said converter for signaling.

C is the automatic switch, preferably mounted in the casing $D^\times$ of the transmitter D. Said switch makes the proper connections automatically when the receiver E is hung thereon or removed.

F is the bell.

G is the battery.

The coils of the converter A are subdivided into two series, respectively comprising primary coils P, P', and $P^2$ and secondary coils S, S', and $S^2$. The aforesaid converter-coils are conveniently wrapped upon a U-shaped core $A^\times$ and provided with an armature $F^\times$. Rigidly mounted in said armature is a flexible stem $f^\times$, which carries the striker $f$ for the bell F.

For convenience of illustration I have shown the divisions of the converter-coils as longitudinally disposed in alternation upon the core $A^\times$. I do not, however, desire to restrict myself to such an arrangement, said illustration being merely typical of any arrangement of said subdivisions which shall permit of their operation, as hereinafter set forth.

The switch B, hereinafter termed the "reversing-switch," serves to rapidly reverse the connections between the battery G and the primary coils P, &c., so that in the operation of signaling the current from said battery alternates in direction through said coils. Said switch is constructed as follows: The metal disks $B'$ and $B^2$ are provided with notches and projections so proportioned that when said two disks are concentrically mounted in a common plane an insulating-space exists between the proximal edges of said notches and projections, as indicated by the heavy line in Fig. 1. Said disks are fixedly mounted in said relation upon the non-conducting disk $B^3$, provided with a shaft $B^4$, which may be conveniently rotated by means of the handle $B^5$.

As hereinafter described in detail, the contact-spring $G'$ serves to normally thrust the switch B out of contact with the remaining springs $G^2$ and $P^4$ and $P^5$. In said normal position of the parts the spring $G'$ is in contact with the spring $P^3$; but when said switch is manually thrust in the opposite direction (indicated by the arrow in Fig. 1) a sufficient distance to bring the disks $B'$ and $B^2$ into contact with the springs $G^2$, $P^4$, and $P^5$ said movement serves to lift the spring $G'$ out of contact with the spring $P^3$.

In the normal position of the apparatus the receiver E is hung upon the automatic switch C, depressing the latter into the position indicated by dotted lines in Fig. 1. In said position the coils of the converter A are so connected that the latter serves as a ringer for the bell F, the circuits through said coils being as follows: Any current entering on the line X passes through the secondary coils S S, thence by the connection $s'$ through the coils $S' S'$, thence by the connection $s^2$ through the coils $S^2 S^2$, and by the connection $s^3$ to the contact-spring $c^2$ in the transmitter-casing $D^\times$. Said spring $c^2$ being in contact with the arm $C^2$ of the switch C, connection is made through the latter to the line $X'$. It is therefore manifest that in said normal position of the apparatus a current upon the line X $X'$ will be directed through the entire group of secondary coils comprised in the converter. When said current is induced by a similar converter or its equivalent, the effect will be to rapidly vibrate the armature $F^\times$ and striker $f$, and thus ring the bell F.

When it is desired to signal upon the line, the shaft $B^4$ is advanced in the direction of the arrow, as aforesaid, against the pressure of the contact-spring $G'$ until the reversing-switch is in contact with the springs $G^2$, $P^4$, and $P^5$. Said movement lifts the spring $G'$ out of contact with the spring $P^3$, and in said position of the parts the circuits are as follows: Beginning at the battery G, the wire $g$ leads directly to the spring $G'$, which is in contact with the projection $b^2$ upon the disk $B^2$. The spring $P^4$ being also in contact with the disk $B^2$, connection is made by the wire $p$ with the primary coils P P, thence by the wire $p'$ with the primary coils $P' P'$, and from the latter by wire $p^2$ with the primary coils $P^2 P^2$. Said coils connect by the wire $p^3$ with the spring $P^5$, which bears upon the other disk $B'$ of the reversing-switch B, and the spring $G^2$, which also bears upon the said disk $B'$, is connected with the opposite pole of the battery G by means of the wire $g^2$. It is therefore manifest that the entire battery G is connected at its respective extremities with the respective contact-springs $G'$ and $G^2$, which are in turn in contact with the respective disks $B^2$ and $B'$, and the whole series of primary coils being connected at their extremities with the respective contact-springs $P^4$ and $P^5$, which bear upon the respective disks $B^2$ and $B'$ in line with the intermeshed projections upon said disks, it is obvious that rotation of the reversing-switch B by means of the handle $B^5$ will occasion the reversal of direction of the current from said battery G through said primary coils P, &c., ten times in each revolution of said switch. The other circuits connecting with the line X $X'$ remaining undisturbed in the operation of the signaling-switch B, all of the series of secondary coils S, &c., being in connection with said line, it follows that the high-potential current induced in said secondary coils by the rapid reversal of the primary current passing through the primary coils P, &c., will be effective upon the line X $X'$ to operate signal devices in circuit therewith. When the automatic switch C is relieved of the receiver E, said switch assumes the position indicated in full lines in Fig. 1, thereby making the proper connections for transmission of speech, the circuits through the station being then as follows: The current coming in on the line X passes directly through the secondary coils S S and thence by the wire $s^4$ to the receiver E. From said receiver the wire $s^5$ connects with a contact-spring $c$ within the transmitter-casing $D^\times$. Said spring being in contact with the arm $C'$ of the switch C, connection is made through the latter to the other line $X'$. Simultaneously with the establishment of the aforesaid circuit from the line through the secondary coils and the receiver said switch C connects the battery G, primary coils P P, and transmitter D in the primary circuit as follows: from the battery G by the wire $g$ to the contact-spring $G'$, contact-spring $P^3$, wire $p$, to the primary coils P P, leading thence by the wire $p^4$ to the transmitter D and thence by the connection $p^\times$ to the lever-arm $C'$, thence through the contact-spring $c'$ and wire $g'$ back to the battery G. It is therefore obvious that certain connections are made by the reversing-switch B, and certain other connections are made by the automatic switch C, so that by the coöperation of said two members of the apparatus differing numbers of the subdivisions of the primary coils are included in the respective talking and signaling circuits.

For simplicity of illustration I have shown both the primary and secondary talking-circuits as limited to one division of the converter-coils; but it will be understood that a number of said divisions may be included therein in accordance with the resistance required for the particular line $X X'$ with which the apparatus is connected.

Referring now to the embodiment of my invention in a desk outfit, which is illustrated in the remaining figures of the drawings, it will be seen that the shaft $B^4$ is mounted for rotation in the bearing $b^4$ in the side of the casing H, which incloses the reversing-switch B and the converter A. Said shaft is of such length as to permit of its movement in the direction of the arrow upon said figure, so that said switch B may be thrust into contact with the respective contact-springs $G^2$, $P^4$, and $P^5$, as before described. Said contact-springs are secured upon the vertical partition $h'$, fixed to the horizontal partition $h$ in any convenient manner. Said partitions are conveniently secured in the casing H by means of screws $h^2$, as indicated in Fig. 3, and serve to insulate said springs, &c. Referring to Figs. 4 and 5, it will be seen that said springs $G^2$, $P^4$, and $P^5$ are provided with stop-plates $h^3$, which limit their movement in the direction of the switch B, so as to insure the breaking of contact with said switch when the spring $G'$, bearing upon the projection $b^2$ of said switch, effects the return of the latter to its normal position. (Indicated in Fig. 3.) As shown in Fig. 4, the contact $P^3$ overhangs said spring $G'$, so as to contact therewith in the normal position of the latter. Connection is thus made between the wire $g$ and the wire $p$. Said contact $P^3$ therefore coöperates with said contact $G'$ and said reversing-switch B to break the talking-circuit during the operation of said switch and restore said circuit upon the termination of said operation.

The bottom of the casing H is countersunk to receive a pad H', preferably of soft rubber, upon which said casing rests. The top $H^2$ of the casing H is secured thereon by means of screws $h^4$, entered through the partition $h$, and supports a tubular standard I, to which the transmitter-casing $D^\times$ is pivotally secured by screws $i$. As shown in Fig. 2, said screws are provided with milled heads I', so that the casing $D^\times$ may be set at any desired angle with relation to the standard I and clamped by rotation of said screws $i$.

The line-wires $X X'$ and the wires $g g'$ and $g^2$, which lead to the battery G, are conveniently inclosed in a flexible cable $x$, which enters the casing H through an insulating-bushing $x'$. For clearness of illustration I have omitted certain wiring connections from the detail views of the apparatus. It is to be understood, however, that the connections are made substantially as hereinbefore described in relation to Fig. 1.

The wires $g'$, $p^4$, $s^3$, and $s^5$ extend through the opening $h^\times$ in the partition $h$ and through said standard I to the transmitter-casing $D^\times$, connecting therein with the respective contact-springs $c'$, $p^5$, $c^2$, and $c$. Said springs are conveniently mounted upon a segmental partition $c^3$ of insulating material.

The transmitter D may be of any convenient form, but in the form shown in Fig. 3 comprises two electrodes (marked, respectively, $d$ $d'$) which connect, respectively, with the casing $D^\times$, as indicated at $p^\times$, and with the contact-spring $p^5$. Connection is thus made from one electrode of the transmitter D through the casing $D^\times$, standard I, cover $H^2$, and casing H to a screw $x^3$, where, as indicated in Fig. 3, the line-wire $X'$ is attached.

Referring to Figs. 7 and 9, it will be seen that the automatic switch C is provided with springs $c^3$, which maintain it in its upper position when freed from the receiver E. In the normal position of the apparatus said receiver is conveniently hung on the hook-piece $C^\times$. (Best shown in Fig. 2.) To permit the receiver E to hang perpendicularly in the various positions of angular adjustment of the casing $D^\times$, said hook is mounted upon the lever C, as shown in Fig. 9, so as to oscillate freely upon the threaded stem $c^4$ of said lever, which is engaged in a similarly-threaded socket in said hook. To limit the oscillatory movement of said hook, said stem is cut away for approximately one-half of its diameter, and the screw $c^\times$ is entered in the hook-socket, so as to contact with said stem when swung in either direction.

It is desirable in a desk outfit such as that just described to provide means whereby the volume of sound from the bell F may be varied. This may be conveniently effected by the device shown in Fig. 4, wherein said bells F F are shown to be thin shells, each adjustably secured upon the casing H by means of a threaded stud F', which is provided with a head $f'$ wider than the slot $h^5$, through which the stud extends. The sleeve $f^3$, surrounding said stud F', serves to maintain the bell F in proper radial position when the latter is clamped thereon by means of the nut $f^4$. As indicated, said slot $h^5$ is longer than the flattened shoulder $f^2$ upon the stem F', which serves to prevent rotation of the latter. It is obvious that the nut $f^4$ may be loosened and the stud F' shifted toward or away from the striker $f$ and the effective blow of the latter varied in accordance with the volume of sound required for a signal at the particular station.

I am aware that it is not broadly new to group the ordinary elements of a telephone-station upon a single structure, such as a backboard mounted upon a wall, or to group a receiver, transmitter, induction-coil, buzzer, and a signaling-key upon a stand for what is commercially known as a "desk outfit,"

wherein said signaling-key serves merely to connect a battery directly with the line for the purpose of signaling. The latter arrangement is, however, impracticable for other than a very short line, and, as aforesaid, upon lines of ordinary length it has hitherto been necessary to use a magneto-generator for signaling purposes of such dimensions as to preclude its inclusion in a group upon a desk, it being usual to separately mount such a generator upon a near-by wall. Such an arrangement is obviously inconvenient, as the generator must of course be manipulated whenever the operator desires to signal upon the line.

I am also aware that it is old in the art of telephony to induce secondary signal-currents upon a line by interrupting a primary circuit at a station, many Letters Patent of the United States having been granted for devices to effect such action either manually or automatically, of which No. 199,007, granted to T. A. Watson, and No. 569,807, granted to J. T. Williams, are respective types. I disclaim such devices.

In view of the state of this art it is to be noted that my converter structure A is distinct from the receiver structure E and that the coils of said converter do not perform any function of a receiver-coil of a talking-circuit.

The alternating currents induced by my reversing-switch differ essentially from the interrupted currents aforesaid both in character and efficiency.

I do not, however, desire to limit myself to the precise embodiment of my invention which I have shown and described, as it is obvious that various modifications may be made therein without departing from the spirit of my invention.

I therefore claim—

1. In a telephone-station the combination with a converter having secondary and subdivided primary coils, which form part of the talking-circuit, and are distinct from the receiving instrument, of line connections for said secondary coils, current-supply connections for said primary coils, and manually-operative means to continuously reverse said primary connections, substantially as set forth.

2. In a telephone-station the combination with a converter having primary and secondary coils, which form part of the talking-circuit, and are distinct from the receiving instrument, of a call-signal armature in the magnetic field of said converter, line connections for said secondary coils, current-supply connections for said primary coils, and manually-operative means to continuously reverse said primary connections, substantially as set forth.

3. In a telephone-station the combination with a converter having primary and secondary coils, which form part of the talking-circuit, and are distinct from the receiving instrument, of a bell-striker armature in the magnetic field of said converter, a bell, line connections for said secondary coils, current-supply connections for said primary coils, and manually-operative means to continuously reverse said primary connections, substantially as set forth.

4. In a telephone-station the combination with a converter having primary and secondary coils, which form part of the talking-circuit, and are distinct from the receiving instrument, of line connections for said secondary coils, current-supply connections for said primary coils, manually-operative means to continuously reverse said primary connections, and means coöperative with the reversing element to alternately increase and diminish the current-supply to said primary coils, for the respective signaling and talking circuits, substantially as set forth.

5. In a telephone-station the combination with a converter having subdivided primary and secondary coils, of line connections for said secondary coils, current-supply connections for said primary coils, means to continuously reverse said primary connections, and means to alternately make connection with differing numbers of said subdivisions of the primary and secondary coils, for the respective talking and signaling circuits, substantially as set forth.

6. In a telephone-station the combination with a converter having primary and subdivided secondary coils, of a signal-armature for said converter, line connections for said secondary coils, current-supply connections for said primary coils, means to continuously reverse said primary connections, and a switch in the line-circuit adapted to alternately make connections with differing numbers of said subdivisions of the secondary coils, for the respective talking and signaling circuits, substantially as set forth.

7. In a telephone-station the combination with a converter having secondary and subdivided primary coils, of line connections for said secondary coils, current-supply connections for said primary coils, switch mechanism to continuously reverse said primary connections, and means coöperative with said reversing-switch whereby differing numbers of said subdivisions of the primary coils are included in the respective talking and signaling circuits, substantially as set forth.

8. In a telephone-station the combination with a converter having secondary and subdivided primary coils, of line connections for said secondary coils, current-supply connections for said primary coils, switch mechanism to continuously reverse said primary connections, and means coöperative with said reversing-switch whereby the entire number of subdivisions of the primary coils may be included in the signaling-circuit, and a predetermined number of said coils be cut out by the release of said switch, substantially as set forth.

9. In a telephone-station the combination with a converter having subdivided primary and secondary coils, of line connections for said secondary coils, current-supply connections for said primary coils, switch mechanism to continuously reverse said primary connections, means coöperative with said reversing-switch whereby differing numbers of said subdivisions of the primary coils may be included in the respective talking and signaling circuits, and a switch in the line-circuit adapted to alternately make connection with differing numbers of said subdivisions of the secondary coils for the respective talking and signaling circuits, substantially as set forth.

10. In a telephone-station the combination with a converter having subdivided primary and secondary coils, of a signal-armature for said converter, line connections for said secondary coils, current-supply connections for said primary coils, switch mechanism to continuously reverse said primary connections, means coöperative with said reversing-switch whereby differing numbers of said subdivisions of the primary coils may be included in the respective talking and signaling circuits, and a switch in the line-circuit adapted to alternately make connections with differing numbers of said subdivisions of the secondary coils for the respective talking and signaling circuits, substantially as set forth.

11. In a telephone-station the combination with a converter having primary and secondary coils, of line connections for said secondary coils, current-supply connections for said primary coils, switch mechanism to continuously reverse said primary connections, and means coöperative with said reversing-switch, whereby the talking-circuit is automatically broken during the operation of said reversing-switch and restored upon the termination of operation of said switch, substantially as set forth.

12. In a telephone-station the combination with a converter having primary and secondary coils, forming part of the talking-circuit, and distinct from the receiving instrument, of a call-signal armature in the magnetic field of said converter, line connections for said secondary coils, current-supply connections for said primary coils, rotary reversing-switch mechanism for said primary connections, an inclosing casing for said converter, and said switch mechanism, and an exterior handle for said switch mechanism, substantially as set forth.

13. In a telephone-station the combination with a converter having primary and secondary coils, of a signal-armature provided with a bell-striker, line connections for said secondary coils, current-supply connections for said primary coils, a rotary reversing-switch mechanism for said primary connections, an inclosing casing for said converter and said switch mechanism, an exterior operating-handle for said switch mechanism, a slot in said casing for said bell-striker, and a bell upon the exterior of said casing in adjustable relation with said striker, substantially as set forth.

14. In a telephone-station the combination with a converter having primary and secondary coils, distinct from the receiver-coils, of line connections for said secondary coils, current-supply connections for said primary coils, rotary reversing-switch mechanism for said primary connections, an inclosing casing for said converter and said switch mechanism, an exterior operating-handle for said switch mechanism, a tubular standard upon said casing, a transmitter upon said standard, and wiring connections between said converter said reversing-switch and said transmitter, extending through said standard, substantially as set forth.

15. In a telephone-station the combination with a converter having primary and secondary coils, of a call-signal armature in the magnetic field of said converter, line connections for said secondary coils, current-supply connections for said primary coils, rotary reversing-switch mechanism for said primary connections, an inclosing casing for said converter, and said switch mechanism, an exterior operating-handle for said switch mechanism, a tubular standard upon said casing, a transmitter upon said standard, and wiring connections between said converter said reversing-switch and said transmitter, extending through said standard, substantially as set forth.

16. In a telephone-station the combination with a pivoted transmitter-casing, of an automatic switch mounted within said casing, a receiver-supporting arm upon said switch extending through said casing, a spring within said casing adapted to raise said arm, a passage-way from said transmitter-casing through said pivotal connection, and insulated wiring connections for said transmitter and switch concealed within said passageway, substantially as set forth.

17. In a telephone-station the combination with a pivoted transmitter-casing, of an automatic switch mounted within said casing, a receiver-supporting arm upon said switch extending through said casing, an oscillatory hook upon said arm, and wiring connections for said transmitter and switch within said pivoted casing, substantially as set forth.

18. In a telephone-station the combination with a tubular standard, of a transmitter-casing pivotally mounted upon the extremity of said standard, an automatic switch mounted in said casing, a receiver-supporting arm upon said switch exterior to said casing, a spring within said casing, adapted to raise said arm, a passage-way through said pivotal connection, leading from said transmitter-casing to within said standard, and insulated wiring connections for said transmitter-switch, extending in concealment from said casing through said passage-way and standard, substantially as set forth.

19. In a telephone-station the combination with a converter having primary and secondary coils, of a bell-striker armature for said converter, line connections for said secondary coils, current-supply connections for said primary coils, a switch mechanism for said primary connections, an inclosing casing for said converter and said switch mechanism, a slot in said casing for said bell-striker, a bell-standard extending through an aperture in said casing, a bell upon said standard, and means to adjust said standard relative to said striker, substantially as set forth.

WILLIAM A. DRYSDALE.

Witnesses:
GEO. P. MCARTHUR,
LOUIS W. VEIGEL.